United States Patent [19]
Konopka

[11] 3,873,210
[45] Mar. 25, 1975

[54] OPTICAL DEVICE FOR VEHICULAR DOCKING

[75] Inventor: John P. Konopka, West Chester, Pa.

[73] Assignee: Burroughs Corporation, Detroit, Mich.

[22] Filed: Mar. 28, 1974

[21] Appl. No.: 455,647

[52] U.S. Cl................... 356/138, 340/26, 350/167, 356/153, 356/172
[51] Int. Cl...................... G01b 11/26, G02b 27/00
[58] Field of Search .............. 350/167, 190; 340/26; 356/138, 153, 154, 172

[56] References Cited
UNITED STATES PATENTS
| | | | |
|---|---|---|---|
| 2,991,743 | 7/1961 | Ogle | 356/138 |
| 3,510,216 | 5/1970 | Wagman | 350/167 |
| 3,729,262 | 4/1973 | Snead et al. | 356/153 |

*Primary Examiner*—Ronald L. Wibert
*Assistant Examiner*—Richard A. Rosenberger
*Attorney, Agent, or Firm*—Francis A. Varallo; Edward J. Feeney, Jr.; Edward G. Fiorito

[57] ABSTRACT

An optical display device is described which utilizes a lens system of ribbed lenticulars to provide the guidance information needed to park or dock aircraft and other vehicles. In terms of the center line alignment information presented to the observer, the device is capable of generating a wide-angle azimuth display which permits visual contact therewith at the earliest possible time during docking maneuvers. Additional information as to closing rate and stopping point is also provided by the display. No modification of, or installation of equipment in, the vehicles being parked is required.

11 Claims, 17 Drawing Figures

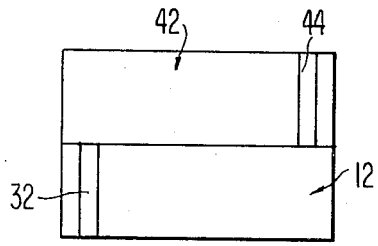
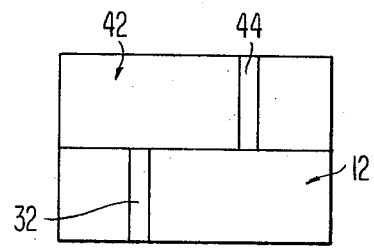
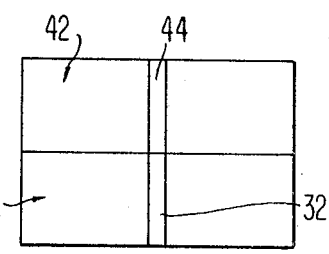
Fig.5A  Fig.5B  Fig.5C
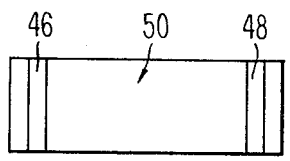
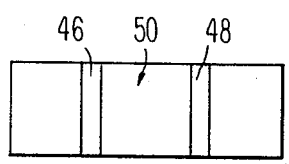
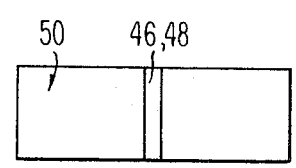
Fig.7A  Fig.7B  Fig.7C
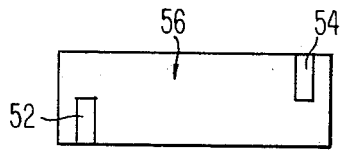
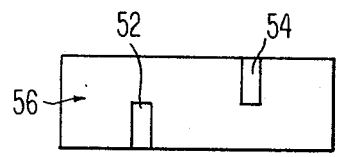
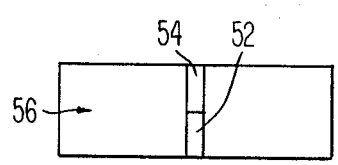
Fig.8A  Fig.8B  Fig.8C
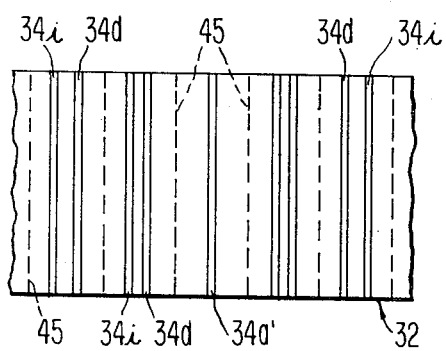
Fig.9
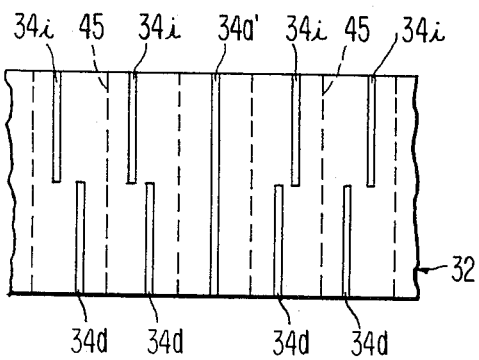
Fig.10
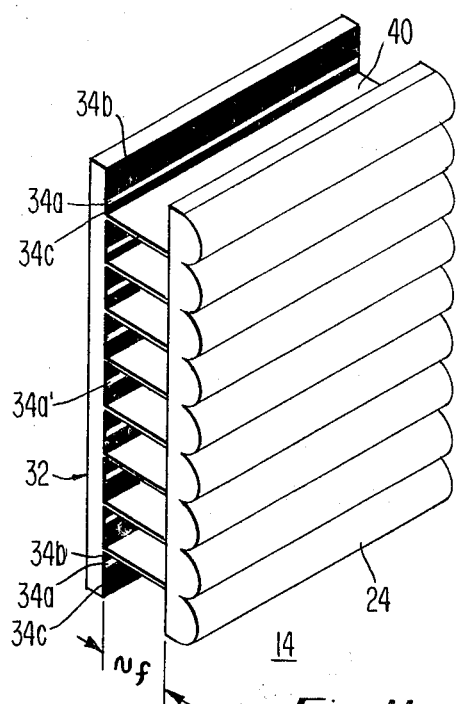
Fig.11

OPTICAL DEVICE FOR VEHICULAR DOCKING

CROSS REFERENCE TO RELATED APPLICATION

The display device of the present invention is related to the docking system described and claimed in application Ser. No. 164,350, which issued as U.S. Pat. No. 3,729,262, "Optical Lens Docking System," by Edwin E. Snead and Jay B. Pitkow. Also of general interest is application Ser. No. 427,497, "Optical Chromatic Display for Navigational Guidance,", by John P. Konopka. Both the reference patent and application are assigned to the same assignee as the present application.

BACKGROUND OF THE INVENTION

As noted in the reference patent, the docking of aircraft at airport terminals has become an increasingly complex and hazardous part of airline ramp activity. A severe limitation exists in the ability of the ground signal crew to assist the pilot of aircraft, particularly those commonly referred to as "jumbo jets," in their positioning and stopping at predetermined ramp locations. the docking system of the reference patent utilizes optical techniques to provide the pilot with all the information he requires to dock his aircraft without ground signal men. The system functions equally well under a variety of climatic conditions.

For providing the above-mentioned information, the reference system utilizes a plurality of lenses including Fresnel's and lenticulars arranged with respect to light sources to create information for center line steering, closing rate and stopping. The latter are provided respectively as a vertical bar of light which appears to move horizontally and which the observer aligns with a datum or reference line; a horizontal bar of light which appears to the observer to move in a vertical direction with a speed corresponding to the closing rate; and finally, a plurality of stop cues for various type aircraft — the stopping point being determined when the observer aligns the horizontal bar of light with a stop cue associated with the type of aircraft being docked.

The present docking device emulates the optical performance of the above-mentioned reference system by utilizing a unique lens system which employs ribbed lenticulars as the primary lens. Such lenticulars are also used in the reference system but only in a secondary role as light spreaders in conjunction with Fresnel lenses. The Fresnel lenses used in the reference system have been eliminated in the present system. The present configuration is advantageous in that the optical parameters permit the use of display cabinets of considerably reduced depth. Moreover, with respect to the center line steering portion of the display, an extra wide azimuth audience angle may be initially provided, or this capability may be added to an existing lenticular device, without greatly increasing the cost thereof.

SUMMARY OF THE INVENTION

In accordance with the present invention there is provided a device capable of concurrently displaying interrelated information required by the observer for properly docking or parking an aircraft or other vehicle. The device comprises a lens system of ribbed lenticulars, a field member, and a light source arranged to create information for center line steering, closing rate, and stopping. The field member may be configured in various manners to provide different display presentations. For example, the field member may comprise for each cylindrical lens of the lenticular array, a translucent film strip which is colored or colorless, and two adjacent opaque strips situated respectively on opposite sides thereof. The strips are mounted in repetitive fashion behind the lenticulars at a distance corresponding to the common focal plane of the array of cylindrical lenses. The axes of the film strips are oriented in the same direction as those of the lenticular ribs.

The chromatic display of the reference application also utilizes a ribbed lenticular and a field member. However, its operation and optical organization are significantly different from that of the present device. The reference device is employed as a landing aid — the field member being comprised of sets of translucent color strips. The entire face of the device appears to the observer to glow in a color which indicates generally the observer's position relative to a prescribed path. In the present device, which generates "moving" light bars, each set of multicolor strips is replaced by a central translucent strip flanked by strips or areas of optically opaque black pigmented material. Also significant is that in the reference chromatic display, the longitudinal center line of the central color film strip of each set is exactly aligned with the center line of the cylindrical lens with which it is associated. In the present device, only the center line of the translucent strip associated with the central cylindrical lens is in exact alignment with this lens. Each of the other film strips is situated off the center line of the cylindrical lens with which it is associated. If, for purposes of explanation, the lenses are numbered consecutively starting with the central lens of the array, which is designated "zero,", and progressing outward in both directions, the strips associated respectively with the number "one" lenses adjacent the central lens will be displaced from the center line of such lenses by a predetermined base dimension. If the displacement is toward the central lens, it is considered a "decrement;"; if away from the central lens, an "increment." The consecutive displacements are cumulative. Thus, the strips associated with the number "five" lenses will be displaced from the centerlines of such lenses a distance equal to five times the base dimension.

A display utilizing all decremented strips generates an apparent virtual image, seen as a bar of light, which appears to the observer to move across the face of the display in the same direction as the observer moves. On the other hand, a system having incremented strips generates an apparent real image, which appears to move in the opposite direction.

As will be described in detail hereinafter, the present display device contemplates in the center line steering presentation, the use of a single field member with either incremented or decremented translucent strips, or alternately, both arrangements of strips on the same member. In the former, a single bar of light is generated which the observer aligns with a datum marker to pursue a prescribed path of travel. In the latter embodiment, the incremented and decremented strips generate respectively two vertical bars of light extending full length across the height of the lenticular array. These appear to the observer to move toward each other from opposite sides of the center line display as he approaches center line alignment. The degree of deviation of the observer from such alignment is indicated by the amount of horizontal displacement of the two bars from each other. The convergence and total overlapping of the bars occurs when the observer is aligned with and is proceeding on the prescribed path.

Other presentations similar to the latter are also possible. For example, by using a single field member and providing incremented and decremented strips on the respective vertical top and bottom halves thereof, two vertical bars of light, each extending only halfway across the vertical face of the display are generated. These bars move toward each other as the observer approaches alignment with the desired path and form a straight line pattern when alignment is achieved. The same effect, but on a larger scale, can be had by using tow separate lenticular assemblies placed one above the other — one having an incremented strip field configuration; the other, a decremented configuration.

The horizontal stop bar presentation may utilize a lenticular array similar to that of the center line presentation but rotated ninety degrees. A field member with either incremented or decremented strips, but usually the latter, is employed to generate a single bar of light which appears to move in a vertical direction toward a designated stopping point. The speed with which this "stop bar" appears to move provides an indication of closing rate. An alpha-numeric display is provided with associated stop cues representing the aircraft or vehicles being parked. Alignment of the horizontal stop bar with the appropriate stop cue, while maintaining center line alignment, defines a precisely repeatable stop point.

Other features of the invention will become more fully apparent in the detailed description of the display device and its mode of operation.

BRIEF DESCRIPTION OF THE DRAWING

FIGS. 5A, 5B and 5C illustrate center line module presentations achieved by the stacking of optical assemblies constructed respectively in accordance with the optical schematics of FIGS. 3 and 4.

FIGS. 7A, 7B and 7C illustrate certain center line module presentations in accordance with the optical arrangement of FIG. 6.

FIGS. 8A, 8B and 8C illustrate other center line module presentations derived from the optical schematic of FIG. 6.

FIG. 9 illustrates the arrangement of incremented and decremented strips on a common field member to generate the presentations of FIGS. 7A, 7B and 7C.

FIG. 10 illustrates another arrangement of incremented and decremented strips on a common field member to generate the presentations of FIGS. 8A, 8B and 8C.

FIG. 11 is a partial diagrammatic representation of the stop bar module portion of the display.

DESCRIPTION OF THE PREFERRED EMBODIMENT

Figure 1:
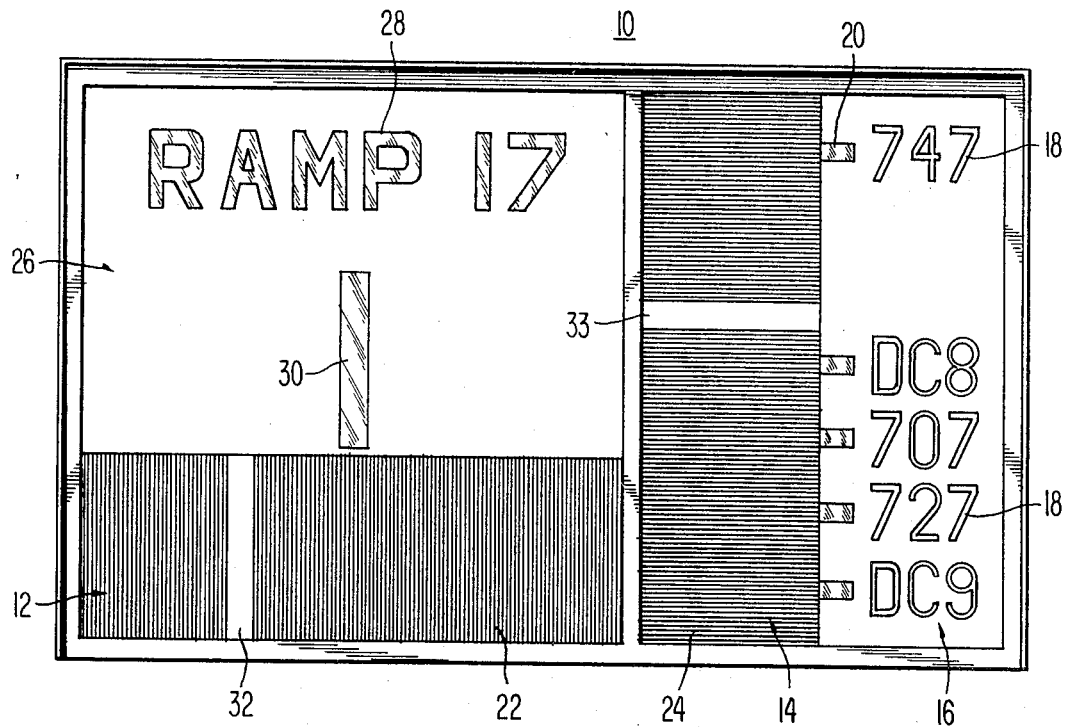
FIG. 1 is a front view of the optical display device as seen by the observer.

FIG. 1 is a pictorial representation of one embodiment of the lenticular docking device 10 illustrating the center line module 12 and the stop bar module 14, the latter having on one side thereof (or on both sides if required for the particular application) an opaque back-lighted mask 16 having designations 18, representing the different types of aircraft to be docked. Rectangular symbols positioned adjacent the alpha-numeric designations serve as stop cues 20. The mask portion 16 of the display is light shielded from the remainder of the display.

The external surfaces of the display are comprised of the vertical ribbed lenticulars 22 in the center line module 12 and horizontal ribbed lenticulars 24 in the stop bar module 14. An additional back-lighted mask section 26 is employed in the device 10. This section which is light-shielded from the remainder of the display, includes for example, a designation 28 of the particular ramp being serviced by the display. It also includes a narrow translucent bar-like window which serves as a datum marker 30.

In terms of aircraft docking, the position of light bar 32 relative to the datum marker 30 indicates the attitude in the alignment of the aircraft with respect to the gate center line. The pilot brings the lower vertical bar 32 into alignment with the datum marker 30 and maintains this alignment until the aircraft is docked. As will be described in detail hereinafter, the converging bar presentations eliminate the necessity for the datum marker. As he proceeds toward the stopping point, the pilot observes a horizontal light bar 33 which appears to move toward the stop cue 20 associated with the type of aircraft being docked. When the bar 33 is adjacent the last mentioned cue, the aircraft is at the prescribed stopping point.

Figure 2:
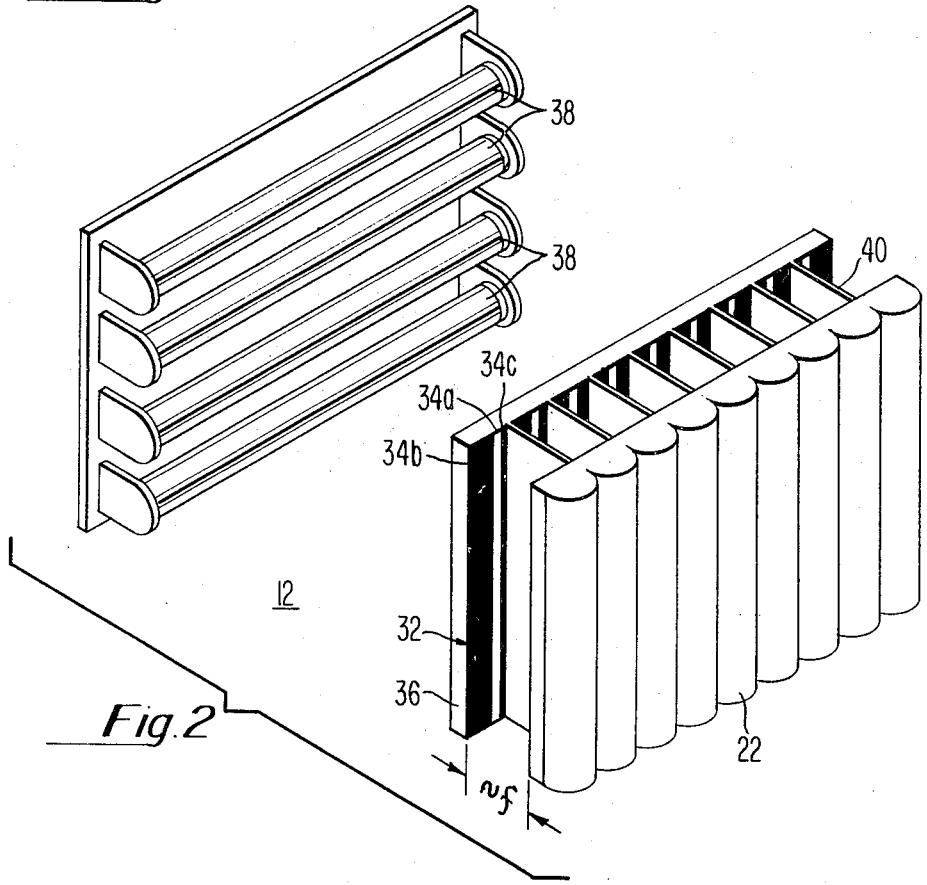
FIG. 2 is a simplified diagrammatic illustration of the center line alignment portion of the display of FIG. 1.
Figure 3:
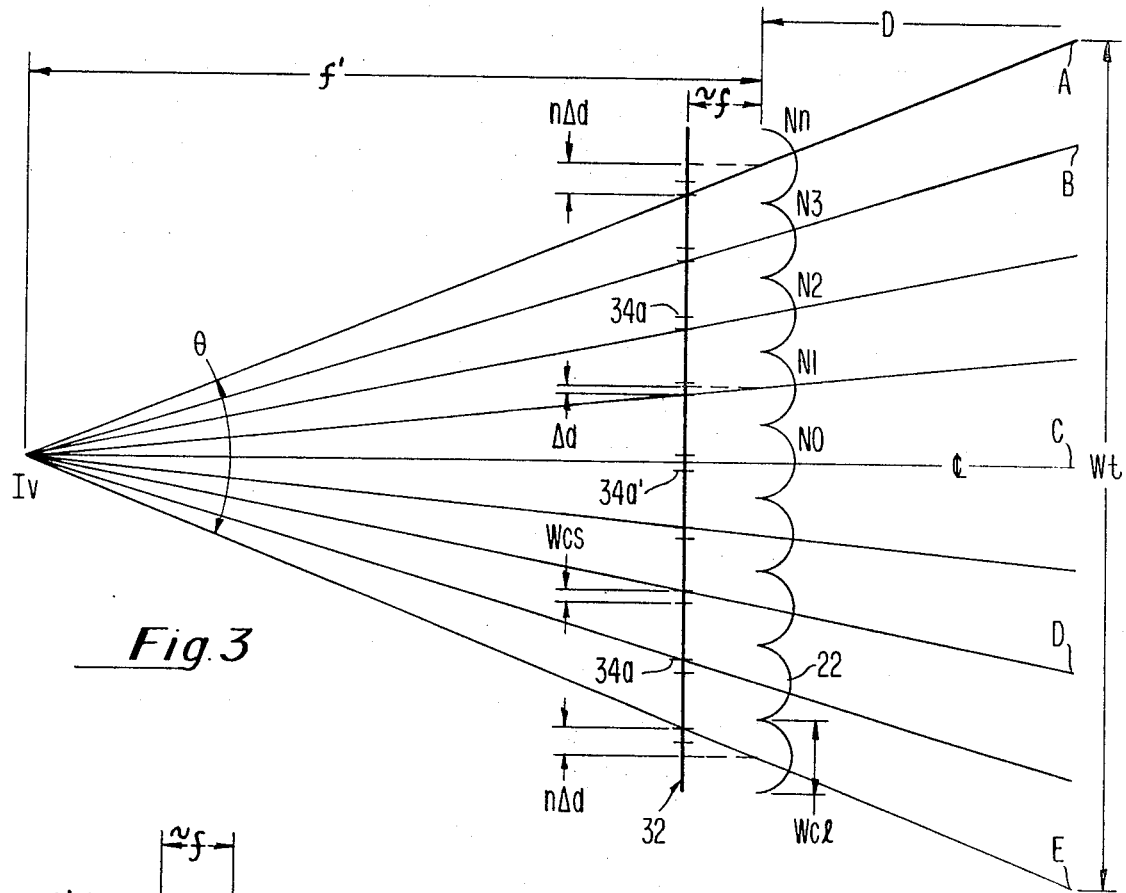
FIG. 3 is a simplified optical schematic depicting an arrangement in which the translucent strips of the field member are decremented.

In actual operation, the display unit 10 is installed on the terminal building at a height to accommodate the particular types of aircraft to be docked. The center line module 12 of the unit is positioned a predetermined distance to the left of the gate ceneter line. This distance is chosen to coincide with the distance the pilot is displaced from the center of the aircraft. The unit 10 is also mounted at a height such that an angle exists between the pilot's eye and the display FIG. 2 is a diagrammatic illustration of the embodiment of the center line module 12 depicted in FIG. 1, and FIG. 3 is the corresponding simplified optical schematic. With reference to both FIGS. 2 and 3, there is illustrated a lens system comprised of cylindrically ribbed lenticulars 22, a field member 32 comprising a plurality of sets of strips, each set having a center translucent strip 34a, which may be colorless or pigmented so as to produce an amber color, and adjacent strips 34b and 34c of optically opaque material. These strips may be of a film material mounted or otherwise affixed to a glass or plastic substrate 36, or the substrate may be molded or formed with a desired pattern.

In any event, a translucent colorless, or colored, strip 34a is associated with each cylindrical lens making up the lenticular array. Only the strip 34a' associated with the central lens, NO in FIG. 3, of the array has its longitudinal center line aligned with that of the lens. Each of the other strips 34a is displaced from the center line of its associated lens. The actual displacement of a strip is a function of the distance of its associated lens from the center of the lenticular array — the displacement being cumulative and increasing by a constant amount form strip to strip, progressing outward from the central strip. The actual displacement may be incremented or decremented to produce respective different optical effects as will be evident from the schematics of FIGS. 3 and 4. As shown in FIG. 2, the translucent strips are back-lighted by light sources 38, illustrated for purposes of example as fluorescent tubes. The use of a plurality of such sources insures uniform light distribution across the bar 32 as it traverses the width of module 12. Opaque vane-like projections 40 shown in FIG. 2, but omitted in the optical schematics for the sake of clarity, are placed between adjacent sets of strips. These projections serve as light shades and prevent the observer from seeing through any given lens, a pattern derived from a translucent strip not associated with that lens, as may be the case for extremely wide viewing angles. The projections may also be used as pre-focusing separators since their dimensions may be selected such that when they are placed contiguously between the field member and the lenticulars, the focus is automatically attained.

The lenticular lenses 22 and 24 of FIG. 1 may be described as a fused assemblage of a plurality of cylindrical lenses. The cylindrically ribbed pieces illustrated are assumed to be clear and colorless, although colored lenticulars could also be used. The axes of the ribs may be mounted vertically as in the center line module 12 for center-line guidance information, or horizontally as in the stop-bar module 14, for stopping point information. The action of the cylindrically ribbed lenticulars can be considered as that of a sequence of cylindrical lenses or prism angles with sufficiently frequent repetition that they appear to the observer to be continuously adjacent. In a plane perpendicular to the rod axes, each cylindrical lens exhibits the qualities of a circular lens and has, for example, normal magnification and dispersion. On the other hand, in a plane parallel to the rod axis, the cylindrical lens exhibits only those properties associated with common plate glass.

It has been mentioned previously, that a translucent film strip or slit 34a is associated with each cylindrical lens of the array. It has also been noted than only the film strip associated with the central lens of the array is exactly centered in relation to this lens. All other strips are displaced with respect to the centers of their associated lenses. The optical schematic of FIG. 3 illustrates the positioning of the strips or slits 34a with respect to the lenses 22. The arrangement is of the "decremented" type wherein the cumulative displacements are toward the center of the array.

The parameters associated with FIG. 3 are defined as follows:

$Na$ — Number of cylindricals in lenticular array
$Nb$ — Number of cylindricals encompassed by a light beam
$f$ — Focal length of individual cylindricals
$f'$ — Apparent focal length of system
$D$ — Viewing Distance
$Iv$ — Apparent virtual image point
$Wt$ — Total viewing width at distance D
$Wb$ — Width of light bar viewed at a distance D
$66d$ — Decrement of first slit off system centerline
$n\Delta d$ — Decrement of slit associated with the $n^{th}$ cylindrical $Wc1$ — Width of individual cylindrical
$Wcs$ — Width of a translucent strip or slit
$\theta$ — Total system viewing angle From the above system parameters the following expressions are derived:

(1) $\Delta d = fWc1/f'$ (2) $\theta = 2 \tan^{-1} NaWc1/2f'$ (3) $Wcs = Nb - 1/2 (\Delta d + fWc1/D)$ (4) $Nb = Wb/Wc1$ With continued reference to the optical schematic of FIG. 3, an observer at position "A" will see only the entire aperture of cylindrical $Nn$ glowing and no others as their focal points are focused elsewhere. As his position is altered to position "B" he will only see cylindrical $N3$, and cylindrical $Nn$ appearing to extinquish. The same progression repeats through position "E." It should be noted that if the translucent strip is too narrow, the visible vertical light will appear to extinquish before the next one is seen as the observer translates his position from "A" to "E". Therefore, the minimum width of the strip or slit 34a should be at least equal to the value of decrement $\Delta d$ of the first cylindrical off center, to observe a smooth transition of light from one cylindrical to another. This slit width Wcs is measured starting from the point of the calculated base displacement, and widening in the direction of the center-line of its associated cylindrical.

It now becomes apparent to the observer that a vertical bar of light progresses across the entire aperture of the lenticular array in the same direction as his travel and at such a rate that would be equivalent to an apparent virtual image, $Iv$, that would appear at distance $f'$ behind the lenticular lens. This distance is normally many times the focal length $f$ of any individual cylindrical.

The embodiment of the display device described hereinbefore may be designed to generate a visual presentation similar to that provided by the reference patented docking system. In an operative embodiment of the reference patented docking system, the display aperture of the center line module is approximately 10 inches in width and the virtual image, 3.7 feet behind the primary lens. The width of an individual cylindrical of the array is 0.3 inch; its radius of curvature, 0.25 inch; the thickness, 0.25 inch; and the focal length, approximately 0.5 inch.

Utilizing these characteristics in the present system and referring to FIG. 3, the value of decrement of the first translucent strip off-center associated with lenticular N1 is calculated from the formula for $\Delta d$ in equation (1) as 0.0034 inch. This fixes the first translucent strip approximately 0.0035 inch off-center (the dashed line), measured toward the middle of the array, of its associated cylindrical. As noted hereinbefore, this is a cumulative requirement and the second strip associated with cylindrical N2 will be 0.007 inch off-center of its associated cylindrical. Therefore, the last strip (the sixteenth) on either extreme will have a total decrement of approximately 0.055 inch. The width Wcs of the translucent strips required to enable an observer to see a light bar three inches wide at 200 feet is calculated from equation (3) as 0.017 inch. The total angle $\theta$ of observation is 13 degrees; the toatal viewing width at a distance D of 200 feet is 46 feet. The last two parameters are identical to that provided by the reference docking system.

The total viewing angle $\theta$ of the present system may be easily widened from 13 degrees to 31 degrees and the total viewing width at 200 feet, increased from 46 feet to 110 feet by providing two smaller lenticulars contiguous to the lenticular array and positioned respectively on opposite sides thereof. The translucent strips associated respectively with these added lenticulars would be continued to be decremented as before. The new aperture required to accomplish the wide angle presentation need only be 24 inches wide, about a 140 percent increase over the referenced system aperture.

Figure 4:
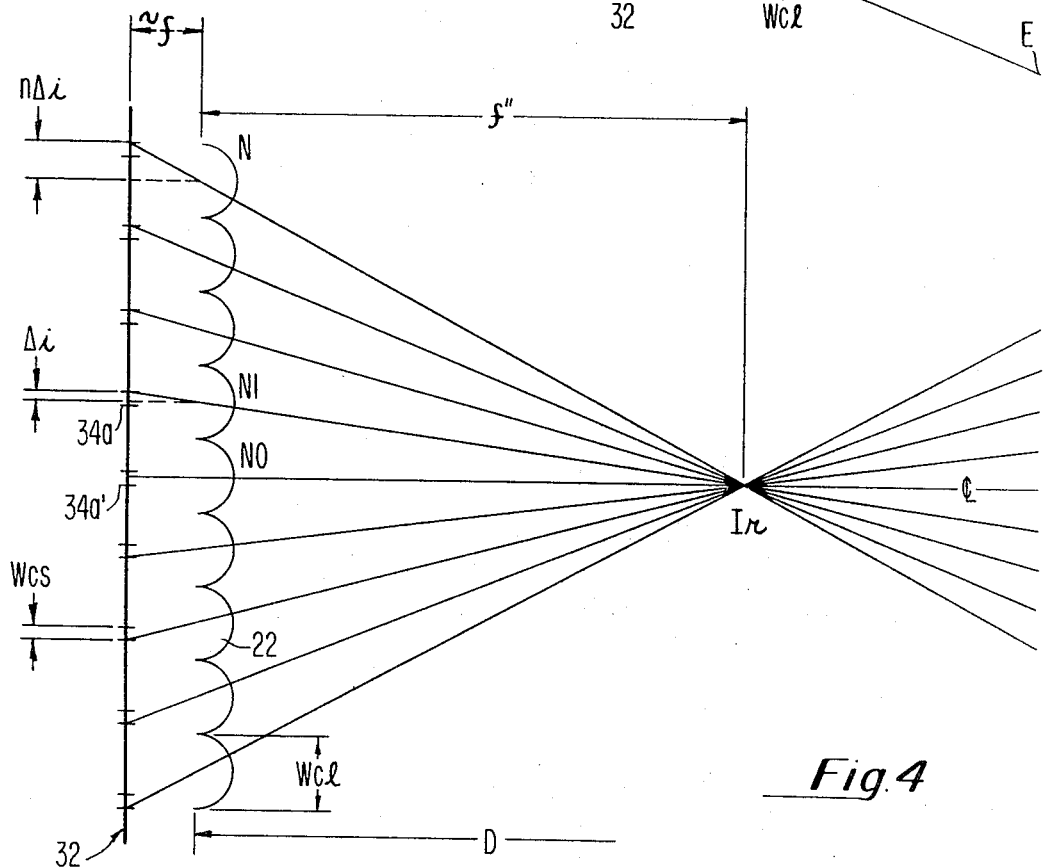
FIG. 4 is a simplified optical schematic similar to that of FIG. 3, except that the translucent strips are shown in an incremented condition.

Thus far, the description of the invention has concerned itself with the generation of an apparent virtual image by the cumulative decrementing of the field member translucent strips. As seen in FIG. 4 the strips may in fact be cumulatively incremented, that is positioned off the centers of their associated cylindrical lenses in a direction away from the center of the lenticular array. Thus, slit $34a'$ associated with central cylindrical NO is positioned on the center line of the lens. The strip or slit $34a$ associated with cylindrical N1 is incremented by the distance $\Delta i$, which is a base dimension. The width of the slit Wcs is measured starting from the point of the calculated base dimension and widening in the direction of the center line of its associated cylindrical. The slit associated with lens $Nn$ on either side of the central lens, is displaced a distance $n\Delta i$ from the center line of the lens (indicated by the dashed line) in a direction away from the center of the array. An apparent real image Ir is formed. Equation (3) for finding the width of the translucent strips (Wcs) is modified as follows for the optical arrangement of FIG. 4:

(5) $Wcs = Nb - 1/2 \ 2 \ (\Delta i - fWcl/D)$

The other equations presented hereinbefore in connection with FIG. 3 are valid for the optical presentation of FIG. 4, except that $f'$ is replaced with $f''$ and $\Delta d$, with $\Delta i$.

The apparent real image, Ir, of FIG. 4 comprising a vertical bar of light which appears to move in a direction opposite to that of the observer. The center line steering display of FIGS. 5A, 5B and 5C as seen by the observer result from a combination of the module 12 of FIG. 1 with its decremented strip field member, and module 42 with incremented strips, as arranged in FIG. 4. The two modules 12 and 42 are simply stacked one above the other. The observer, on beginning the docking maneuver first sees the light bars 32 and 44 close to the outer edges of the display as in FIG. 5A. At this point he may be approximately 15 degrees off the desired center line. In correcting his position, he observes the two bars moving toward each other, and in FIG. 5B has reduced his deviation to about eight degrees. With further correction of his path, he achieves alignment with the center line as indicated by the display of FIG. 5C.

Other display presentations are possible utilizing the optical techniques taught hereinbefore. It is significant to note that the system utilizing the same primary lens and a single field member having a combination of both decremented and incremented strips is capable of generating concurrently both virtual and real images. The optical schematic of FIG. 6 depicts such a combination.

A lenticular array 22 and a field member 32 with both incremented and decremented translucent strips generates an apparent virtual image Iv and an apparent real image Ir. The sets of presentations shown respectively in FIGS. 7A, 7B, 7C and 8A, 8B and 8C result from the optical arrangements of FIG. 6. The display in the sets differ from each other as a result of the placement of the incremented and decremented strips on the field member. In the case of FIGS. 7A, 7B and 7C, the two translucent strips associated with each cylindrical lens traverse the complete vertical height of the field member 32 which corresponds to the vertical height of the lenticular array 22. This arrangement is illustrated more clearly in FIG. 9, wherein the decremented strips $34d$ and incremented strips $34i$ are shown on field member 32. The dashed lines 45 indicate the boundaries of the associated individual cylindrical lenses and show the relationship of the strips thereto. Strip $34a'$ is aligned with the center line of the central lens of the array. The effect of this configuration is the generation of two light bars 46 and 48, in module 50 as seen in FIGS. 7A, 7B and 7C. With reference to the latter FIGS. and continued reference to FIG. 6, an observer at point A will see the display of FIG. A; at point B, the display of FIG. 7B indicating an approach to alignment; and at point C which is on the prescribed path of travel, the overlapping of the light bar into a single bar as shown in FIG. 7C.

With regard to FIGS. 8A, 8B and 8C, two translucent strips are associated with each cylindrical lens, but those arranged on the field member 32 in a decremented mode are made to extend only to one-half the height of the field member (such as the lower half); while the incremented strips, traverse only the other half of the field member 32 (in this case, the upper half). FIG. 10 illustrates this configuration. The decremented strips $34d$ in the lower half of field member 32 are shown in relation to the incremented strips $34i$ on the upper half of member 32. The positioning of each set of strips is shown in relation to the associated cylindrical lens, the longitudinal edges of which are represented by the dashed lines 45. Strip $34a'$ is aligned with the center line of the central lens of the array. This results in a display presentation similar to that of FIGS. 5A, 5B and 5C except that instead of two stacked lenticular arrays, only a single array is required to generate a split-bar presentation. An observer at points A, B and C in FIG. 6 will see respectively the light bar presentations of FIGS. 8A, 8B and 8C, wherein light bars 52 and 54 in module 56 appear to move toward each other as the observer approaches alignment with a prescribed path of travel.

Figure 6:
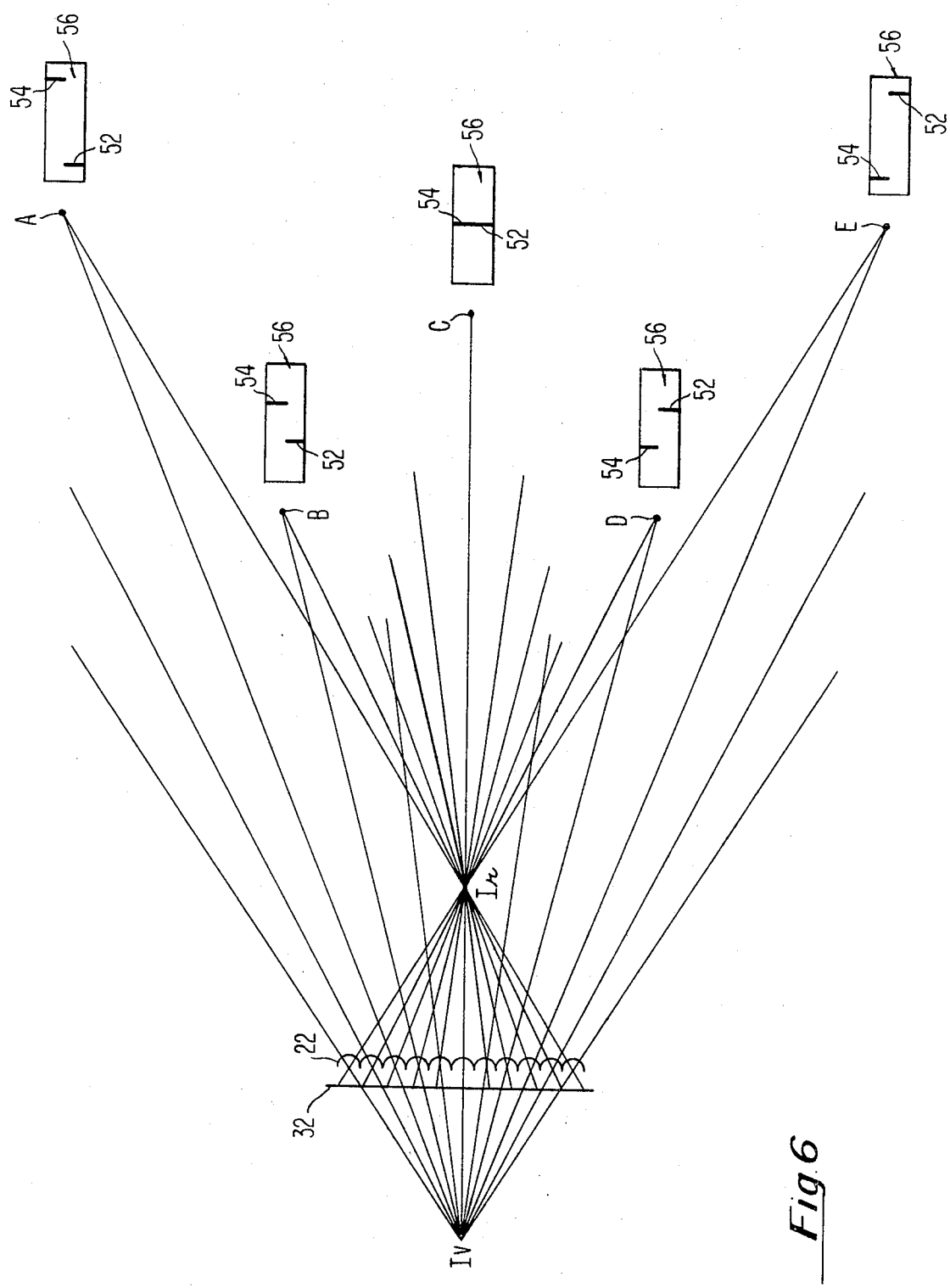
FIG. 6 is a simplified optical schematic showing the optical effects produced by a single field member containing both incremented and decremented translucent strips.

For ease of reference and purpose of example, the display presentations generated by module 56 described hereinbefore in connection with FIGS. 8A, 8B and 8C have been duplicated in the optical schematic of FIG. 6. These presentations which cover an approach to the docking area from one direction, have been expanded in FIG. 6 to include those generated in an approach from the opposite direction. In either case, the presentations depicted are those actually seen by the observer at points A through E inclusive. Point C, which is characterized by alignment of the moving bars of light indicates the proper attitude for vehicle center line steering.

FIG. 11 illustrates diagrammatically the lenticular array 24, field member 32; translucent strips $34a$ and opaque strips 34b and 34c; and separating grid 40. Strip 34a' is aligned with the center line of the central lens of the array. The arrangement is similar to that depicted in FIG. 2 except that the rib axes of the cylindrical lenses are oriented horizontally, rather than vertically. Although not shown, the translucent strips 34a are assumed to be back-lighted by light sources similar to sources 38 shown in FIG. 2. The axes of the fluorescent sources 38 would be oriented vertically to produce an even light distribution across light bar 33 (FIG. 1) as it traverses the length of module 14. The translucent strips 34a may be either decremented or incremented as described hereinbefore in connection with FIGS. 3 and 4. They are illustrated as being decremented in FIG. 11. The choice of configuration will depend upon the application, the mounting height of the display and the size of the vehicles being docked. As compared with the referenced docking system, the stop bar module 14 of the present system is capable of providing an expanded vertical viewing angle which allows a wider range of aircraft types to utilize the display.

From the foregoing description and mode of operation, it should be apparent that the present invention provides a simple, maintenance free, compact and relatively low cost display device which provides positional information for docking purposes. The invention eliminates the need for modifications in, or additions to, the standard equipment carried by the vehicle being guided by the display. While practical embodiments of the invention have been presented herein, it should be understood that changes and modifications of the described arrangements may be needed to fit particular operating requirements. These changes and modifications, insofar as they are not departures from the true scope of the present invention, are intended to be covered by the claims appended hereto.

What is claimed is:

1. An optical device for providing a visual display for guiding a moving observer along a prescribed path of travel comprising:
    a lens system comprised of an array of cylindrically ribbed lenticulars, each lens of said array having a center line and one of said lenses being a central lens of said array, and having its aperture oriented toward said observer,
    a field member having a plurality of translucent slits each of said slits having a longitudinal center line, said slits being separated from one another by opaque sections, said field member being positioned substantially at the focal plane of said lenticular array, at least one of said translucent slits being associated with each lenticular lens of said array, the longitudinal center line of the slit associated with the central lens of the array being aligned with the center line thereof, each of the other slits being displaced from the respective center line of the lens with which it is associated, said displacement being in direct proportion to the distance of the latter lens from the center of the array, and
    a light source positioned with respect to said field member to provide for back-lighting of said translucent slits.

2. An optical device as defined in claim 1 further including means for generating a light bar visible to the observer and serving as a datum marker.

3. An optical device as defined in claim 2 characterized in that said other translucent slits are arranged in a decremented configuration wherein the displacement of each of them from the center line of its associated lens is toward the center of the array,
    said lenticular array forming an apparent virtual image of the decremented slits which is seen by the observer as a bar of light and which appears to move across the aperture of the lenticular array in the same direction as the movement of the observer relative to the display, alignment of said bar of light with said datum marker by said observer being indicative of travel along said prescribed path.

4. An optical device as defined in claim 1 characterized in that said other translucent slits are arranged in an incremented configuration wherein the displacement of each of them from the center line of its associated lens is away from the center of the array,
    said lenticular array forming an apparent real image of the incremented slits which is seen by the observer as a bar of light and which appears to move across the aperture of the lenticular array in a direction opposite to the movement of the observer relative to the display.

5. An optical device as defined in claim 1 further including a plurality of opaque vane-like projections situated respectively at the interstices of adjacent lenses and positioned contiguously between said field member and said ribbed lenticulars, said projections preventing said observer from seeing through any given lens an image derived from a translucent slit not associated with that lens.

6. An optical device as defined in claim 1 characterized in that a pair of said slits are associated with each lenticular lens of said array, one of said slits being displaced in decremented fashion toward the center of said array, the other of said slits being displaced in incremented fashion away from the center of said array, said lenticular array generating concurrently respective images of the incremented and decremented slits which are seen by said observer as two bars of light and which are separated from each other in proportion to the deviation of said observer from said path of travel.

7. An optical device as defined in claim 6 wherein said pair of slits have their longitudinal axes oriented in the same direction as the ribs of said lenticulars and traverse the entire corresponding surface of said field member, the light bars generated by said system each extending across the entire aperture of said lenticulars in the direction of the lens ribs, said light bars appearing to move toward each other and to completely overlap each other in response to the observer's alignment with said prescribed path.

8. An optical device as defined in claim 6 wherein said pair of slits have their longitudinal axes oriented in the same direction as the ribs of said lenticulars, the incremented ones of said slits traversing one half of the corresponding surface of said field member, and the decremented ones of said slits traversing the other half of said field member surface, the light bars generated by said system being of the split-image type wherein each extends across only one half of the aperture of said lenticulars in the direction of the lens ribs, said light bars appearing to move toward each other and to become aligned as a single full-length bar in response to the observer's alignment with said prescribed path.

9. An optical device as defined in claim 2 wherein the rib axes of said lenticular array and the longitudinal axes of said translucent slits are oriented vertically to provide center line guidance information to said observer, said lenticular array generating a vertical center line bar of light which appears to the observer to move in a horizontal direction in proportion to his azimuthal deviation from said path of travel.

10. An optical device as defined in claim 9 further including a mask section having the designations of the vehicles to be docked together with the associated stop cue symbols, and means for illuminating said vehicle designations and stop cues in said mask section.

11. An optical device as defined in claim 10 further including a second array of cylindrically ribbed lenticulars, the rib axes of said second lenticular array being oriented horizontally, a second field member having a plurality of slits separated from one another by opaque sections, said field member being positioned substantially at the focal plane of said second lenticular array, the longitudinal axes of said slits being oriented horizontally, each of said translucent strips being associated respectively with a lenticular lens of said array, the longitudinal center line of the slit associated with the central lens of said second array being aligned with the center line thereof, each of the other slits being displaced from the respective center line of the lens with which it is associated in direct proportion to the distance of such lens from the center of said second array, a light source positioned with respect to said second field member to provide for the back-lighting of said translucent slits, said second lenticular array generating an image of said slits which is seen by the observer as a horizontal stop bar of light and which appears to move in a vertical direction across said second lenticular array in response to movements by said observer toward or away from said display, the concurrent alignments by said observer of said center line bar with said datum marker and of said stop bar with the appropriate stop cue being indicative of the attainment by said observer of a predetermined stop point along said prescribed path of travel.

* * * * *

UNITED STATES PATENT OFFICE
CERTIFICATE OF CORRECTION

PATENT NO. : 3,873,210
DATED : March 25, 1975
INVENTOR(S) : John P. Konopka

It is certified that error appears in the above-identified patent and that said Letters Patent are hereby corrected as shown below:

ol. 1, line 22, "the" (first occurrence) should read --The--.
ol. 3, line 13, "tow" should read --two--. Col. 5, line 4, "form" should read --from--. Col. 5, line 66, "66" should read --4--.

Signed and Sealed this twenty-sixth Day of August 1975

[SEAL]

Attest:

RUTH C. MASON
Attesting Officer

C. MARSHALL DANN
Commissioner of Patents and Trademarks